US011459222B2

(12) United States Patent
Seawell

(10) Patent No.: US 11,459,222 B2
(45) Date of Patent: Oct. 4, 2022

(54) TELESCOPICALLY ADJUSTABLE TASK TRAY FOR MOBILE ELEVATED WORK PLATFORMS

(71) Applicant: Scott Albert Seawell, Battle Ground, WA (US)

(72) Inventor: Scott Albert Seawell, Battle Ground, WA (US)

(73) Assignee: Scott A. Seawell, Battle Ground, WA (US)

( * ) Notice: Subject to any disclaimer, the term of this patent is extended or adjusted under 35 U.S.C. 154(b) by 200 days.

(21) Appl. No.: 16/501,907

(22) Filed: Jul. 1, 2019

(65) Prior Publication Data

US 2021/0002115 A1    Jan. 7, 2021

Related U.S. Application Data

(60) Provisional application No. 62/763,849, filed on Jul. 2, 2018.

(51) Int. Cl.
*B66F 13/00* (2006.01)
*F16M 11/04* (2006.01)

(52) U.S. Cl.
CPC ........... *B66F 13/00* (2013.01); *F16M 11/043* (2013.01)

(58) Field of Classification Search
CPC ......... B66F 13/00; F16M 11/043; A47B 5/02; A47B 13/003; A47B 13/0081; A47B 96/021; A47B 96/025; A47B 96/06; A47B 2013/006; F16B 2/12

USPC .......................................................... 108/44
See application file for complete search history.

(56) References Cited

U.S. PATENT DOCUMENTS

| | | | | | |
|---|---|---|---|---|---|
| 1,501,116 | A | * | 7/1924 | Inge | A47B 31/06 108/137 |
| 1,830,347 | A | * | 11/1931 | Camden | B60N 3/007 108/137 |
| 1,852,357 | A | * | 4/1932 | Merhar | A47B 31/06 108/149 |
| 1,872,740 | A | * | 8/1932 | Wathen | A47B 31/06 108/149 |
| 1,888,736 | A | * | 11/1932 | Park | A47B 31/06 108/137 |
| 2,934,248 | A | * | 4/1960 | Lown | B60R 5/045 224/542 |
| 3,239,850 | A | * | 3/1966 | Kiss | A47K 3/004 4/559 |
| 3,698,330 | A | * | 10/1972 | Krombach | B25H 5/00 108/44 |

(Continued)

*Primary Examiner* — Joshua E Rodden

(57) ABSTRACT

A telescopically adjustable task tray for mobile elevated work platforms is disclosed. The task tray assembly may be used on most standard sized scissor and boom lift mobile elevated work platforms (MEWP's). It provides easy, fast (under one minute) installation, a convenient work surface, a contained space for placing tools and other items, an ideal surface for assembly, and primarily, an alternative to the old practice of working from the platform floor. The invention is not limited to use on mobile elevated work platforms. It could be used on industrial catwalks, mechanical chases, between two sawhorses, anywhere two horizontal bearing points are available within the telescopic range. The invention could also be modified yet still meet the original scope of the invention.

6 Claims, 3 Drawing Sheets

(56) References Cited

U.S. PATENT DOCUMENTS

| | | | | |
|---|---|---|---|---|
| 3,784,990 | A * | 1/1974 | Elisofon | B60N 2/2854 5/94 |
| 5,331,904 | A * | 7/1994 | DiSimone | B25H 1/12 108/143 |
| 5,443,019 | A * | 8/1995 | Sheldrick | B25H 5/00 108/44 |
| 5,873,311 | A * | 2/1999 | Schlattl | B25H 5/00 108/44 |
| 5,937,766 | A * | 8/1999 | Denny | B25H 5/00 108/143 |
| 6,520,092 | B2 * | 2/2003 | Marshall | B25H 5/00 108/137 |
| 6,655,538 | B2 * | 12/2003 | Saulnier-Matteini | A47B 45/00 211/105.1 |
| 7,523,900 | B1 * | 4/2009 | Hlatky | A47B 23/02 108/102 |
| 2014/0339381 | A1 * | 11/2014 | Weldon | A47K 3/004 248/126 |

* cited by examiner

TELESCOPICALLY ADJUSTABLE TASK TRAY FOR MOBILE ELEVATED WORK PLATFORMS

RELATED USPTO APPLICATION DATA

This application claims benefit of Provisional patent application No. 62/763,849 filed Jul. 2, 2018.

BACKGROUND OF THE INVENTION

The invention relates to mobile elevated work platforms, specifically scissor lifts and boom lifts.

Mobile elevated work platforms are used in any application requiring high work. To name several examples, they are common in commercial and industrial construction and maintenance, aircraft and aerospace construction and maintenance, communication systems construction and maintenance, wind tower erection and maintenance, and film making operations.

In the 1950's the first commercially available mobile elevated work platform, the boom lift, quickly evolved to become "the king of access equipment." Modern boom lifts are capable of reaching heights of 180 feet with an unrestricted load capacity of 750 pounds (Genie SX-180).

In 1963, another MEWP, the scissor lift, was patented by Charles Larsen of the United States. Around 1970 it was market ready and soon became "the Swiss army knife" of the MEWP field. Available in multiple sizes and drive systems for both indoor and outdoor use, some are able to reach heights of 50 feet or more. Scissor lifts became the solution for what the larger boom lifts could not easily access.

MEWP's have become so popular it was inevitable that accessories would follow. Included among them are beverage holders, cell phone holders, camera mounts, clipboard holders, and small tool holders, all of them aimed at operator convenience. Both scissor lifts and boom lifts are equipped with safety rails around the working platform, the top rail usually in the vicinity of 38 inches above the deck. As such, most of the available accessories are designed to hang from or attach to the top rail. But most of the accessories are toy-like in purpose, construction, and durability, and not suited for the rigors of commercial and industrial work environments.

Even more unsuitable are the common worker-improvised versions of MEWP accessories. Because the only available horizontal surface to work from is the floor of the MEWP, the operator will frequently place a piece of plywood or similar support material across the rails to place the myriad of items brought onto MEWP's. The result is frequent dropped-object and tip-over incidents, neither of which are acceptable considering the heights MEWP's can operate at, and the likelihood of people below.

Scissor lifts typically have a platform extension feature that allows the platform to expand 3 to 4 feet in length. This is accomplished via a platform-within-a-platform that simply slides outward. This has apparently been an obstacle in the development of a task tray that can adapt to both configurations. There is nothing commercially available providing this adaptability.

The commercially available products described above do not span the platform widths nor do they provide a usable work surface of sufficient space necessary to efficiently perform MEWP tasks.

There are hundreds of thousands of scissor and boom lifts in use throughout the world at any time, and the tasks they are used for are many. Typically, they are very cluttered and often unsafe because an abundance of tools and objects end up on the floor.

To address health concerns, working from the floor of a MEWP requires continuous bending and twisting; this is not only inefficient, it is a common cause of work—related musculoskeletal disorders (WMSD's). Bending and twisting while lifting an object or tool from the floor of a lift, possibly dozens or even hundreds of times a day, is simply a poor practice that has been common for 6 or 7 decades.

Between the clutter of tools and other objects commonly found on MEWP floors, the bending, twisting, and lifting necessary to retrieve them, and the lack of a surface to work from, it is no wonder dropped objects from MEWP's contribute to a staggering number of dropped object injuries and fatalities. As reported by the International Safety Equipment Association in their "ISEA Leads Industry Action on Preventing Workplace Fatalities from Dropped Objects," in 2016 there were 255 fatalities and 47,920 reported injuries (Bureau of Labor Statistics) from dropped objects in the United States, making this the third leading cause of injuries on the jobsite, according to OSHA.

Products that reduce accidents in the workplace often become required by OSHA once proven to be effective. OSHA does not endorse any specific manufacturers or vendors of safety—related products, but they categorically require items such as hardhats, fall protection, respirators, and lanyards.

It is quite conceivable that an apparatus that reduces both musculoskeletal disorders and dropped object accidents could be a required industrial safety item.

Because it is common for objects to roll off or get bumped off from worker—improvised lift working surfaces, the industrial safety requirement would simply fall under the category of containment.

It should be noted that the guardrail height of most boom and scissor lift platforms (plus or minus 38 inches) is ideal for placement and support of a task tray working surface.

There is a clear need for a horizontal working surface at an ergonomic—friendly height that incorporates the adaptability and adjustability to accommodate the various scissor and boom lift sizes and configurations. This apparatus would increase productivity and worker comfort, and reduce musculoskeletal disorders and dropped-object accidents.

SUMMARY OF THE INVENTION

In accordance with the invention there is provided a horizontal work surface, a task tray, for boom and scissor lift mobile elevated work platforms.

It is therefore an object of the invention to incorporate an adjustable subframe allowing the task tray to fit most sizes of scissor and boom lifts.

It is yet another object of the invention to provide an adjustable subframe allowing the task tray to fit between and bear on the top guardrails regardless of whether the guardrails are made of square or round tubing.

It is yet another object of the invention to provide vertical sides of sufficient height to not only contain items within the tray, but to also provide attachment options for accessories such as clamp-on lights, vises, small tool holders, cell phone holders, and any other accessories designed to attach to a vertical surface.

It is yet another object of the invention to provide simple 4-point attachment of the tray to the adjustable subframe for simplicity of design, ease of manufacturing, and future replacement or repair options of either component.

It is yet another object of the invention to construct the assembly out of lightweight yet strong and durable aluminum for ease of carrying, ease of placement on MEWP's, and rust-free maintenance.

It is yet another object of the invention to incorporate stainless steel spring loaded snap-lock button inserts to mechanically limit the safe extension of each telescopic section.

It is yet another object of the invention to provide a carrying handle for ease and comfort when transporting.

It is yet another object of the invention to provide a secondary handle for ease of placement when extending or retracting the telescopic assembly to fit the varying widths of MEWP's.

It is yet another object of the invention to provide a task tray that will support a load of 100 pounds at full extension of the telescopic assembly. This can be certified by independent lab testing and the apparatus will be labelled accordingly.

It is yet another object of the invention to incorporate industrial hook and loop closure straps at both ends/bearing points to prevent inward lateral motion of the telescopic subframe supports during sudden movement of the MEWP.

It is yet another object of the invention to incorporate rust-proof fasteners.

DETAILED DESCRIPTION OF THE INVENTION

Figure 1:
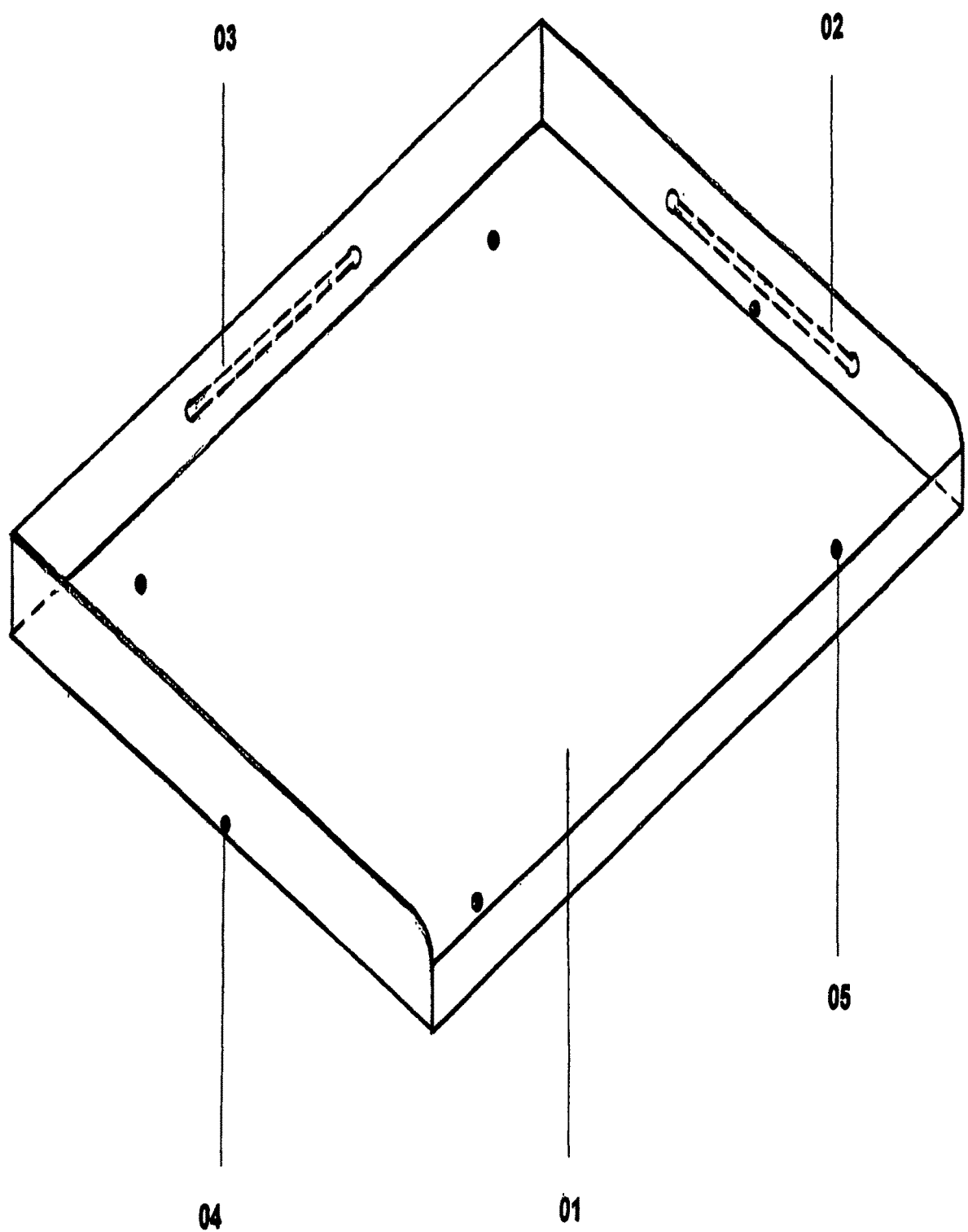
FIG. 1 is a perspective view of the tray component.
Figure 2:
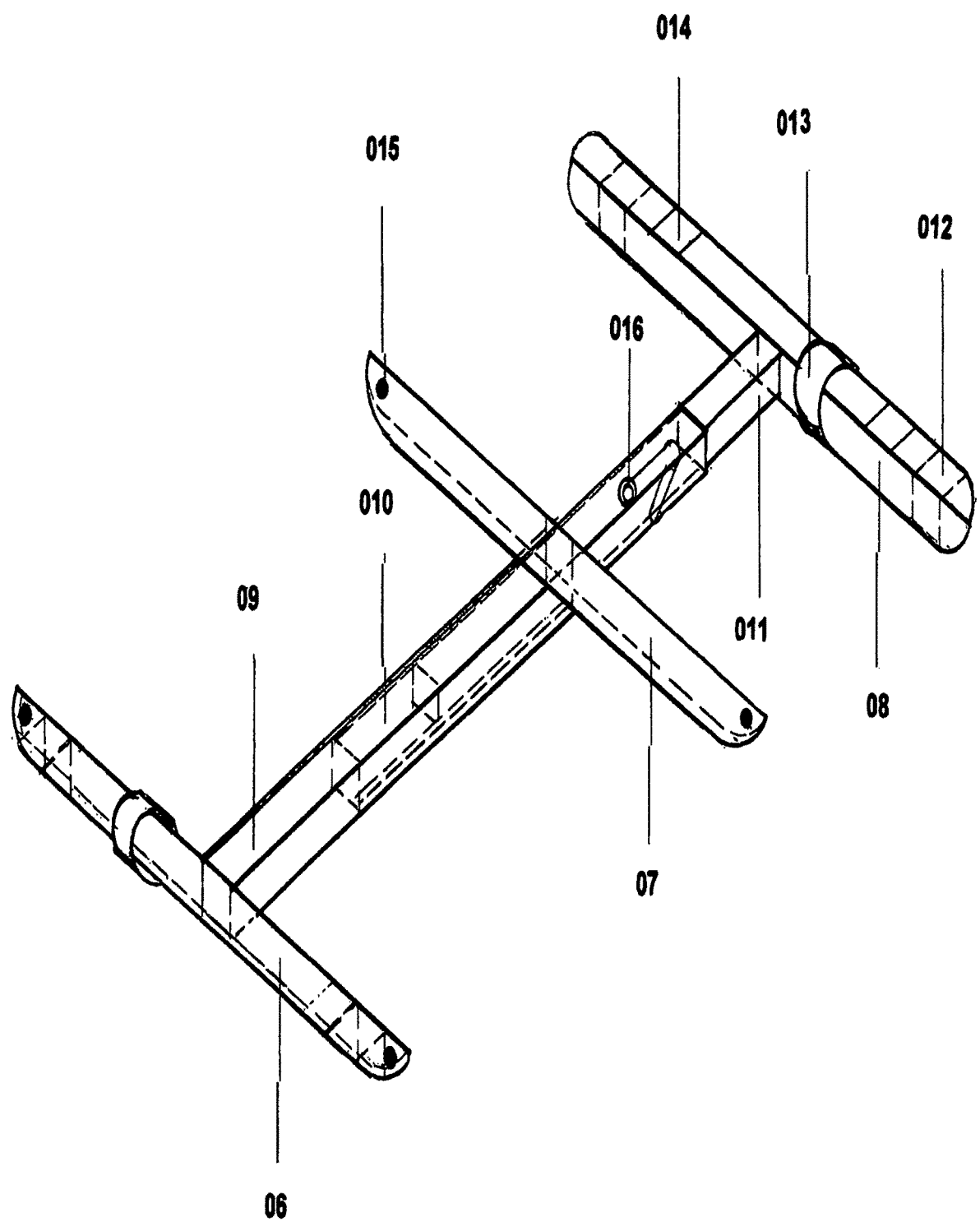
FIG. 2 is a perspective view of the telescopic subframe component.
Figure 3:
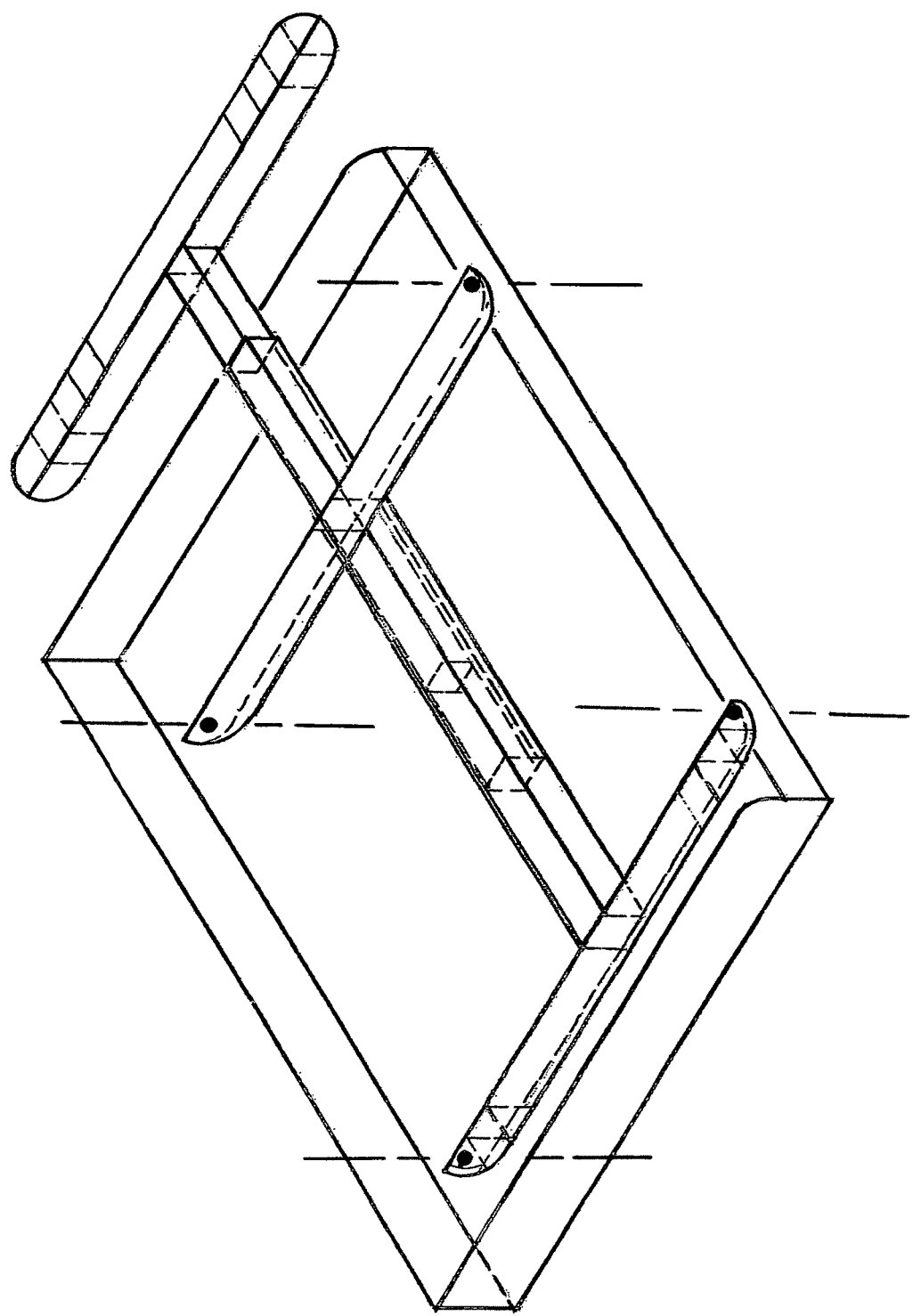
FIG. 3 is a perspective see-through view of the component alignment.

The task tray 01 is comprised of a single aluminum sheet with 4 brake-formed vertical sides and the corners TIG welded. The front side is shorter to accommodate easier hand movement in and out of the tray while still being high enough to contain items in the tray. Four through holes 05 are provided for attachment to the telescopic subframe assembly (FIG. 2). Two holes 04 are provided for drainage to prevent water collection in wet weather. A carrying handle 03 is provided for ease of transporting. At an assembled weight of 20 pounds the task tray is not heavy but it is rather awkward to carry without the handle. A secondary handle 02 is provided for ease of placement while extending or retracting the telescopic sections as needed to fit most MEWP's.

The subframe assembly is comprised of a rigid main frame consisting of left end support angle 06 and right end support angle 07 TIG welded to main tube section 09. The telescopic section includes middle section 010 inserted into main tube 09 and right end section 011 inserted into middle section 010. Right end support angle 07 is TIG welded to right end tube section 011.

Left end support angle 06 and right end support angle 08 fit both between and on top of the scissor or boom lift top guardrail. The telescopic assembly allows an exact fit to the guardrail on each side. Neoprene pads 012 are provided for three reasons: One, for slip resistance between the support angles and the guardrail, two, as spacers preventing the left end angle support fasteners (connecting the tray) from contacting the guardrail, and three, to make the task tray assembly non-conductive to the MEWP as an added safety measure.

Fastener through-holes 015 allow the ¼-20 button head machine screws, nuts, washers 017 to connect the subframe to task tray 01. Snap lock buttons 016 keep the telescopic sections mechanically limited to maximum safe extension. High density plastic bumpers 014 allow for smooth full retraction of the last telescopic section 011 and right end support angle 08. Industrial hook and loop straps 013 allow for securing the apparatus to the guardrails on both ends to eliminate any chance of inward lateral or upward motion during sudden movement of the MEWP.

Manufacturing the invention requires simple shop operations by people having ordinary skill in the art, including using a sheet metal shear and brake for forming the tray, a chop saw for cutting the angle and square tube sections, a drill press for snap-lock button and attachment through-holes, a jig saw for the radiused angle ends, and some ordinary sanding and deburring tools. TIG welding can be farmed out if necessary.

Using the invention is as simple as entering the MEWP work platform, setting the left (fixed end) angle support on the guardrail, setting the right (telescopic) angle support on the opposite guardrail while using the secondary handle to hold the assembly up if necessary, then close the hook and loop strap closure straps. The assembly is ready.

What is claimed:

1. A telescopically adjustable task tray for scissor lift and boom lift mobile elevated work platforms (MEWP's), said task tray comprising:
   a four-sided tray configured to facilitate tasks common to MEWP operation;
   a telescopic sub-frame assembly constructed of a plurality of square tubular sections, the plurality of square tubular sections including a main tube including a left end support angle attached to one end of the main tube and a right end support angle attached to a second end of the main tube, a middle section tube inserted into the main tube and a right end tube section inserted into the middle section tube with an end of the right end tube section not attached to the middle section tube including a right end support angle, the plurality of tubular section configured to allow adjustability necessary to accommodate multiple widths and configurations of MEWP's;
   said four-sided tray including a carrying handle allowing ease of transporting the assembly, and a second handle to facilitate easy placement.

2. The task tray as described above in claim 1, the task tray further comprising: wherein the four-sided tray and the telescopic sub-frame assembly are made from aluminum.

3. The task tray as described above in claim 1, the task tray further comprising: wherein the left end support angle on the main tube and the right end support angle on the right end tube section include at least one of: hook and look straps and high density plastic bumpers.

4. The task tray as described above in claim 1, the task tray further comprising: wherein the left and right end support angles on the main tube are attached to the four-sided tray.

5. The task tray as described above in claim 1, the task tray further comprising: wherein the left and right end support angles on the main tube are attached to the four-sided tray by respective fastener through-holes and at least one of machine screws, nuts and washers located at ends of each of the respective left and right end support angles on the main tube.

6. The task tray as described above in claim 1, the task tray further comprising: wherein snap lock buttons are configured to keep the middle section tube and the right end tube section limited to maximum safe extension.

* * * * *